United States Patent
Wyatt et al.

(10) Patent No.: US 7,415,830 B2
(45) Date of Patent: Aug. 26, 2008

(54) METHOD AND SYSTEM FOR CRYOGENIC COOLING

(75) Inventors: William G. Wyatt, Plano, TX (US); Morris E. Finneburgh, Richardson, TX (US)

(73) Assignee: Raytheon Company, Waltham, MA (US)

( * ) Notice: Subject to any disclaimer, the term of this patent is extended or adjusted under 35 U.S.C. 154(b) by 378 days.

(21) Appl. No.: 11/217,142

(22) Filed: Aug. 31, 2005

(65) Prior Publication Data

US 2007/0044486 A1    Mar. 1, 2007

(51) Int. Cl.
*F25B 19/00* (2006.01)
*F25B 9/00* (2006.01)

(52) U.S. Cl. ............................................. 62/6; 62/51.1
(58) Field of Classification Search .................. 62/6, 62/51.1
See application file for complete search history.

(56) References Cited

U.S. PATENT DOCUMENTS

| | | | |
|---|---|---|---|
| 3,807,188 A | 4/1974 | Lagodmos | 62/514 |
| 3,999,403 A | 12/1976 | Bower et al. | 62/514 |
| 4,028,907 A | 6/1977 | Herrington et al. | 62/222 |
| 4,522,034 A * | 6/1985 | Laskaris | 62/51.1 |
| 4,569,203 A | 2/1986 | Rawlings et al. | 62/6 |
| 4,694,175 A * | 9/1987 | Buller | 250/352 |
| 4,820,923 A * | 4/1989 | Wellman | 250/352 |
| 4,918,312 A * | 4/1990 | Wellman et al. | 250/352 |
| 5,235,818 A * | 8/1993 | Horikawa et al. | 62/51.1 |
| 5,385,010 A * | 1/1995 | Horn | 62/6 |
| 5,404,016 A * | 4/1995 | Boyd et al. | 250/352 |
| 5,811,816 A | 9/1998 | Gallagher et al. | 250/370.15 |

(Continued)

FOREIGN PATENT DOCUMENTS

EP    0 947 787 A1    10/1999

(Continued)

OTHER PUBLICATIONS

Notification of Transmittal of The International Search Report and the Written Opinion of the International Searching Authority or the Declaration; International Filing Date: Aug. 30, 2006; International Application No.: PCT/US2006/033934; Applicant: Raytheon; 14 pages, Jan. 15, 2007.

*Primary Examiner*—William C Doerrler
(74) *Attorney, Agent, or Firm*—Baker Botts L.L.P.

(57) ABSTRACT

According to one embodiment, a method for improving heat transfer between a cold finger of a cryogenic cooler and a Dewar includes forming an annulus between the cold finger of the cryogenic cooler and the Dewar by inserting the cold finger into the Dewar. The cold finger has a first end and a second end. The method also includes inhibiting the formation of convective currents within the annulus in a direction between the first end and the second end. According to another embodiment of the invention, the cooling system includes a cryogenic cooler that includes a cooling section operable to generate cooling fluid and a cold finger operable to receive the cooling fluid. The cooling system also includes a Dewar formed with a void region coupled to an infrared detector. The cold finger is positioned within the void region of the Dewar creating an annulus. The cooling system also includes at least one obstruction disposed within the annulus and operable to inhibit the formation of convective currents in a direction along a length of the cold finger.

14 Claims, 2 Drawing Sheets

U.S. PATENT DOCUMENTS 5,822,994 A * 10/1998 Belk et al. .................. 62/6
6,070,414 A    6/2000 Ross et al. .................. 62/51.1

FOREIGN PATENT DOCUMENTS

| EP | 1 533 582 A1 | 5/2005 |
| JP | 03 152381 A | 6/1991 |
| JP | 08 261821 A | 10/1996 |
| WO | WO 99/51922 | 10/1999 |

* cited by examiner

METHOD AND SYSTEM FOR CRYOGENIC COOLING

TECHNICAL FIELD OF THE INVENTION

This invention relates generally to cooling systems and more particularly to a method and system for cryogenic cooling.

BACKGROUND OF THE INVENTION

Cryogenic coolers are often used to remove heat from infrared detectors and associated electronic components in applications where space is limited. The cryogenic cooler is typically inserted into a Dewar (or housing) onto which one or more detector elements are mounted. Some applications often require that an infrared array of detector elements be cooled to liquid nitrogen temperatures, such as 70 degrees Kelvin. Joule-Thomson and Stirling Cycle coolers are the two cooling techniques most often used to provide controlled cooling at such extreme temperatures.

An important consideration in the operation of a cryogenic cooler is the time required to bring the cooled device down to appropriate temperatures such that it may be operated. Another consideration is the power requirements for maintaining a desired temperature after initial cool down.

SUMMARY OF THE INVENTION

According to one embodiment, a method for improving heat transfer between a cold finger of a cryogenic cooler and a Dewar includes forming an annulus between the cold finger of the cryogenic cooler and the Dewar by inserting the cold finger into the Dewar. The cold finger has a first end and a second end. The method also includes inhibiting the formation of convective currents within the annulus in a direction between the first end and the second end.

According to another embodiment of the invention, the cooling system includes a cryogenic cooler that includes a cooling section operable to generate cooling fluid and a cold finger operable to receive the cooling fluid. The cooling system also includes a Dewar formed with a void region coupled to an infrared detector. The cold finger is positioned within the void region of the Dewar creating an annulus. The cooling system also includes at least one obstruction disposed within the annulus and operable to inhibit the formation of convective currents in a direction along a length of the cold finger.

Certain embodiments of the invention may provide numerous technical advantages. Some, none, or all embodiments of the invention may benefit from the below described advantages. For example, in one embodiment of the invention, a method for cooling inhibits the formation of a convective loop between a cold finger of a cryogenic cooler and a Dewar. Such inhibition of a convective loop results in decreased cool down time for the system. Further, such inhibiting of a convective loop may also increase the effective life time of the cooling system by providing reduced cooling requirements after initial cool down is achieved.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
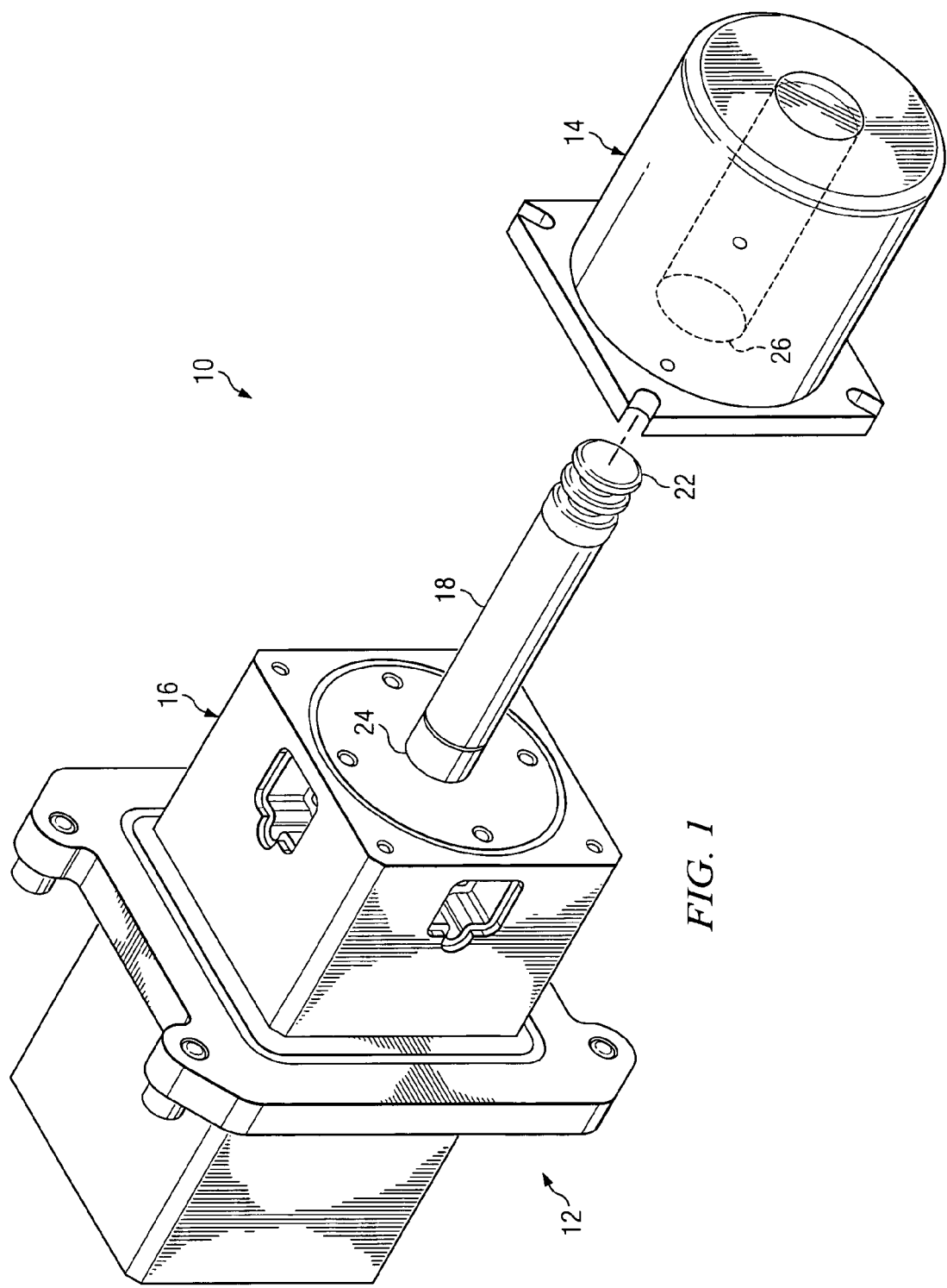
FIG. 1 is a perspective drawing showing a conventional cryogenic cooling system.
Figure 2A:
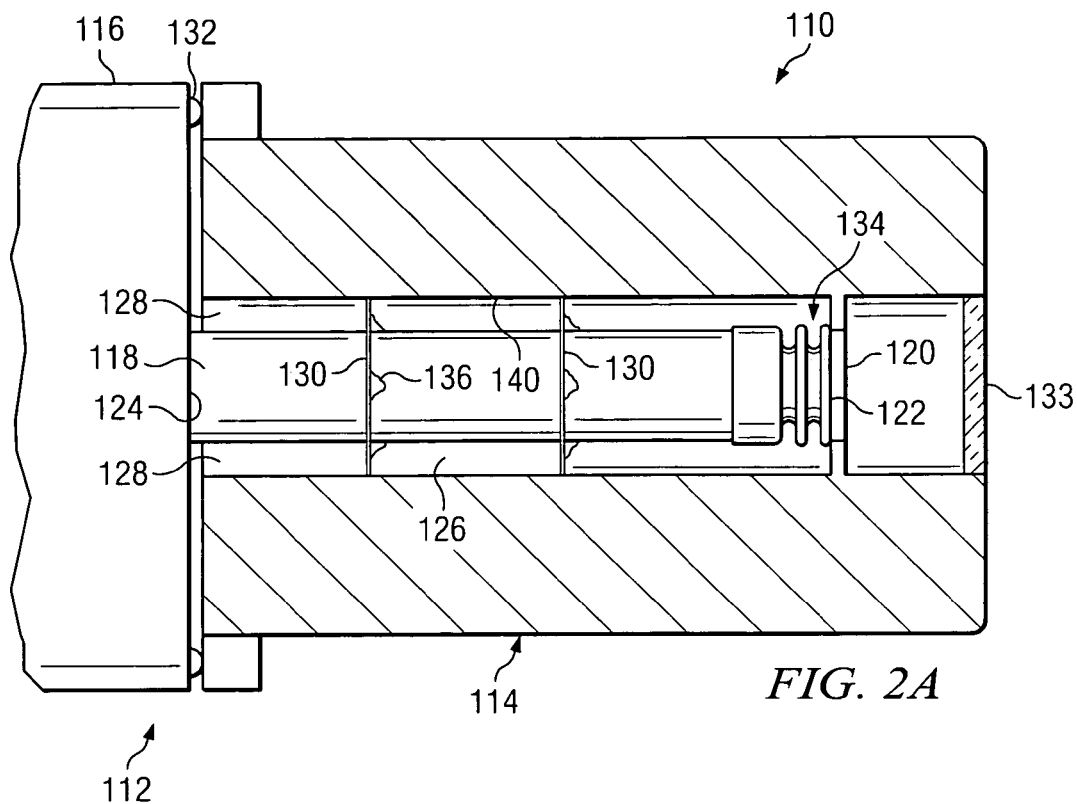
FIG. 2A is a side-view drawing of a cryogenic cooling system according to the teachings of the invention.

Embodiments of the present invention and its advantages are best understood by referring to FIGS. 1 through 2A of the drawings, like numerals being used for like and corresponding parts of the various drawings.

FIG. 1 is a schematic diagram illustrating a conventional cryogenic cooling system 10. Cooling system 10 includes a cryogenic cooler 12 and an associated Dewar 14. Cryogenic cooler 12 includes a cooling section 16 and a cold finger 18. Cooling section 16 generates a cold fluid which is circulated within the interior of cold finger 18. Cold finger 18 is inserted within a void region 26 of Dewar 14 to cool a device, such as an infrared detector formed on part of Dewar 14 (not explicitly shown). Cryogenic cooling systems 10 are well known and are described in the literature, including, for example in U.S. Pat. Nos. 4,028,907; 4,569,203; and 6,070,414.

An important aspect of the operation of cryogenic cooling systems 10 is the time required to bring detector 20 down to a suitable temperature at which it may appropriately operate. Various parameters affect this "cool down" time, including the capacity of cooling system 16, the ambient temperature, the characteristics of the detector, as well as other factors. The teachings of the invention recognize that one of those other factors includes a convective current that is established within an annulus formed between cold finger 18 and Dewar 14. When oriented the cold finger 18 and Dewar 14 combination can be oriented in a vertical direction. Specifically, when a cryogenic cooling system, such as cooling system 10, is oriented such that Dewar 14 is on top of cold finger 18, forming an annulus between cold finger 18 and Dewar 20, the air on a cold side 22 of cold finger 18 is cooler than the air on the hot side 24 of Dewar 18. This means that the air near end 22 is more dense than the air near end 24. When the Dewar 18 is oriented in a vertical direction, this results in a falling of the dense cold air towards end 24 and the rising of the less dense hot air 24 towards end 22. This results in a convective current that transfers hot air to the cold side 22 and cold air to the hot end 24, which is undesirable. This convective current decreases the heat transfer away from detector 20, increasing the effective cool down time of cooling system 10. While this convection effect is probably maximum when the cold finger is oriented upward, the effect will still occur even at a horizontal orientation. The effect will be decreased but will still occur as long as a portion of the cold end of the cold finger is higher than a hotter portion of the annulus surface.

The teachings of the invention recognize that if this convective current can be inhibited or substantially reduced, or the cool down time for cryogenic cooling systems may be reduced. Further, in addition to reducing the cool down time, such inhibition of convective currents can result in decreased heat loss from cooling system 10, which allows cooling system 10 to cool to a desired temperature with less effort. This may result in an increased life in the cooling system. According to one embodiment, this convective current is inhibited by the provision of obstructions between the annulus formed between cold finger 18 and an inner wall of Dewar 14 as described in greater detail below in conjunction with FIGS. 2A and 2B.

FIG. 2A is a schematic drawing of a cryogenic cooling system 110 according to the teachings of the invention. Cryogenic cooling system 110 includes a cryogenic cooler 112 and an associated Dewar 114. Cryogenic cooler 112 includes a cooling system 116 and a cold finger 118. Although any suitable dimensions may be utilized, depending on application, in this example cold finger 118 is approximately 2.5 inches long and approximately 0.5 inches in diameter. The clearance between cold finger 118 and inner wall of Dewar 114 is approximately 60 mils in radius, in one embodiment. Dewar 114 may be formed with a vacuum between its inner and outer wall. Cold finger 118 is formed with a hot end 124 and a cold end 122. Cold finger 118 may be formed with bellows 134 to allow for expansion that may occur due to the extreme temperature changes experienced by cold finger 118 in operation. Although the temperature range of cold finger 118 will vary depending on application, in one embodiment, a cold end 122 of cold finger 118 may reach 70 degrees Kelvin while the hot end 124 of cold finger 118 may reach 75 degrees Celsius. As described above, cryogenic coolers are well known. Cryogenic cooling system 116 may be any suitable type of cryogenic cooling system including those based on the Joule-Thomson or Stirling principles of operation.

Dewar 114 is formed with a detector 120 such that a cold end 122 of cold finger 118 may come into contact with detector 20 for cooling purposes. Detector 20 may be an infrared detector or any other suitable type of detector. Alternatively, a device other than a detector may be cooled by cold finger 118. Cooling system 110 may also include an O-ring seal 132 between Dewar 114 and cooling system 116 to further retain thermal energy within cooling system 112. Also illustrated is a window 133 within Dewar 114 for allowing transmission of infrared energy to detector 120. In one example this window is made of germanium; however, any suitable material may be utilized.

As illustrated, when cold finger 118 is inserted within a void 126 of Dewar 114, an annular region 128 is formed. As illustrated, Dewar 114 has an inner wall 140 forming a portion of annulus region 128. As described above, a convective current loop that brings hot air from hot side 124 towards cold side 122 and cold air from cold side 122 towards hot side 124 would normally be created. According to the teachings of the invention, however, one or more obstructions 130 are provided to inhibit such convective loop formation.

Figure 2B:
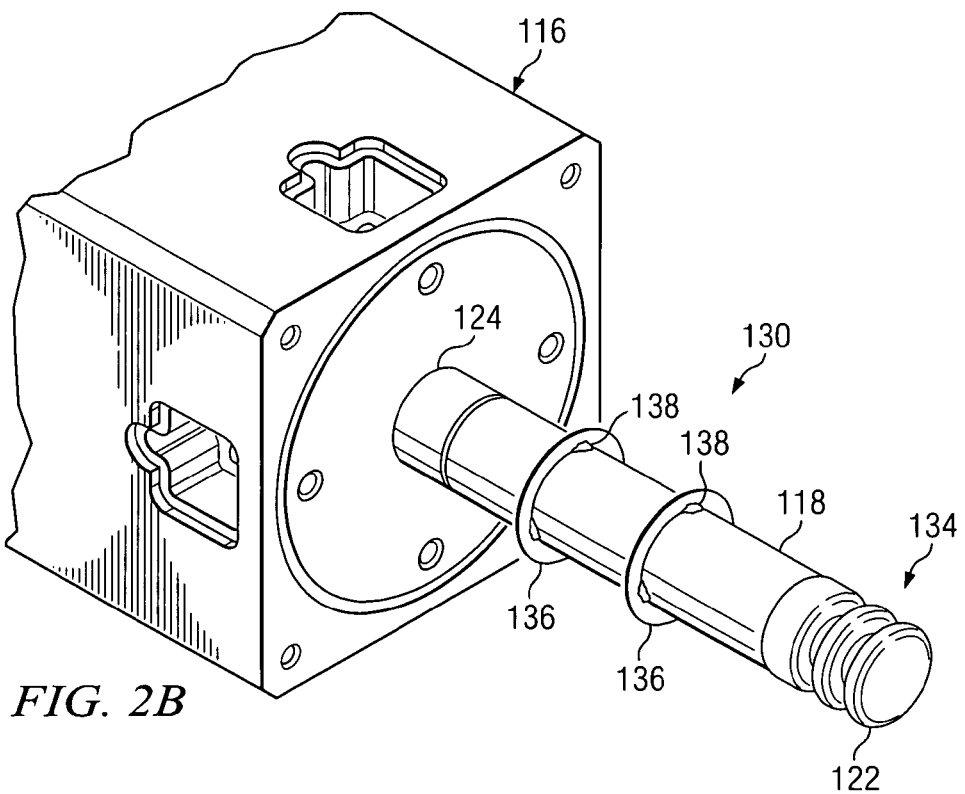
FIG. 2B is a perspective drawing showing a cold finger of the cryogenic cooling system of FIG. 2A.

FIG. 2B is a perspective drawing of cold finger 118 of FIG. 2A, showing additional details of the cold finger. As illustrated, in this example obstructions 130 are disks formed around the perimeter of cold finger 118. In this example there are two thin disks 130 having another perimeter 138 that are attached to cold finger 118 by epoxy. Although any suitable epoxy may be used (or other attachment technique), flexible, low viscosity epoxy polyamide adhesive is one suitable type of epoxy, and in particular Emerson & Cuming 15LV epoxy. In this embodiment, disks 130 divide cold finger 118 along its length into three approximately equal sections. In this embodiment, disks 130 are thin shims having a thickness of approximately two thousandths of an inch thick with very little clearance between an outer edge 138 of disks 130 and the inner wall 140 of Dewar 114. Example radial clearances between inner wall 140 and outer perimeter 138 are less than 0.010 inches, in one embodiment, and in a more particular embodiment is on the order of 0.005 inches; however, other suitable clearances may be utilized. Any suitable obstruction may be utilized; however, more enhanced thermal operation may be obtained by limiting the thermal mass added to cold finger 118. Thus, in this example, disks 130 are formed very thin. Further, any suitable material may be used; however, enhanced operation is provided where disks 130 are formed from a low thermal conductivity material. In this example stainless steel is utilized. As an alternative, a simple O-ring may be utilized; however, operation utilizing an O-ring would be diminished because of the increased thermal mass provided by an O-ring. In another embodiment, obstruction 130 may be placed in the interior of Dewar 114 to inhibit formation of the convective loop. Examples of such embodiments include a pair of disks epoxied to the interior wall 140 of Dewar 114.

The operation of cooling system 110 is described in greater detail with respect to FIGS. 2A and 2B. When cooling of detector 120 is desired, cold finger 118 of cryogenic cooler 112 is inserted into void 126 of Dewar 114 and placed into contact with detector 120. Cooling system 110 either pulses or circulates the cooled fluid in cold finger 118 to bring cold end 122 of cold finger 118 to a desired temperature. Conventionally, a convective current would be formed in the annulus 128 between cold finger 118 and Dewar 114, taking cold air away from cold end 122, which is undesirable. Specifically, such heat transfer increases the cool down time of the system, as well as possibly reducing the life of the cooling system because it would have to work harder to provide the same thermal benefits. However, by insertion of obstructions 130, which are disks in this example, a convective loop may be prevented. This results in reduced cool down time and improved life of cooling system 116 due to the resulting decrease in cooling requirements.

Although the present invention has been described in detail with reference to particular embodiments for the purpose of complying with the first paragraph of 35 U.S.C. Section 112, it should be understood that various other changes, substitutions, and alterations may be made hereto without departing from the spirit and scope of the present invention.

What is claimed is:

1. A method for improving heat transfer between a cold finger of a cryogenic cooler and a Dewar, the method comprising:
   forming an annulus between the cold finger of the cryogenic cooler and the Dewar by inserting the cold finger into the Dewar, the cold finger having a first end and a second end and at least one disk around a perimeter of the cold finger;
   inhibiting the formation of convection currents within the annulus in a direction between the first end and the second end; and
   wherein the at least one disk is less than 0.005 inches thick.

2. The method of claim 1, wherein the at least one disk comprises two disks dividing the cold finger into three approximately equal sections along a length of the cold finger.

3. The method of claim 1, wherein a distance between a perimeter of the at least one disk and an inner wall of the Dewar is less than 0.010 inches thick.

4. The method of claim 1, wherein the at least one disk is formed from stainless steel.

5. A cryogenic cooler comprising:
   a cooling section operable to generate a cold fluid;

a substantially cylindrical cold finger having a perimeter and coupled to the cooling system, the cold finger operable to receive the cooled fluid within an interior of the cold finger; and at least one disk formed around the perimeter of the cold finger, the at least one disk being less than 0.005 inches thick.

6. The cooler of claim 5, wherein the at least one disk comprises two disks dividing the cold finger into three approximately equal sections along a length of the cold finger.

7. The cooler of claim 5, wherein the at least one disk is formed from stainless steel.

8. The cooler of claim 5, wherein the at least one disk consists of two disks.

9. The cooler of claim 5, wherein a first end of the cold finger comprises bellows.

10. The cooler of claim 5, wherein the at least one disk is attached to the cold finger by epoxy.

11. The cooler of claim 5, wherein the at least one disk is integral with the cold finger.

12. A cooling system comprising:
a cryogenic cooler comprising:
 a cooling section operable to generate cooling fluid; and
 a cold finger operable to receive the cooling fluid; and
a Dewar formed with a void region and coupled to an infrared detector, wherein the cold finger is positioned within the void region of the Dewar, creating an annulus; and
at least one disk disposed within the annulus that is operable to inhibit the formation of convection currents in a direction along a length of the cold finger, the at least one disk being less than 0.005 inches thick.

13. The cooling system of claim 12, wherein the at least one obstruction comprises two disks dividing the cold finger into three approximately equal sections.

14. The cooling system of claim 12, wherein the at least one disk comprises at least one disk that has an outer perimeter that is less than 0.010 inches from an inner wall of the Dewar.

* * * * *